United States Patent
Brooks

[15] 3,648,826
[45] Mar. 14, 1972

[54] CONVEYOR-CLEANER
[72] Inventor: Dean P. Brooks, Hesston, Kans.
[73] Assignee: Hesston Corporation, Hesston, Kans.
[22] Filed: May 31, 1968
[21] Appl. No.: 740,810

[52] U.S. Cl. ........................................................198/213
[51] Int. Cl. ...............................................B65g 33/00
[58] Field of Search ........................................198/213–216; 259/161

[56] References Cited

UNITED STATES PATENTS

| 426,488 | 4/1890 | Berkholz | 198/216 |
| 2,709,075 | 5/1955 | August | 198/216 |

FOREIGN PATENTS OR APPLICATIONS

| 2,758 | 7/1879 | Great Britain | 259/161 |

Primary Examiner—Richard E. Aegerter
Attorney—Schmidt, Johnson, Hovey & Williams

[57] ABSTRACT

A screw apparatus adapted for use as a conveyor or as a cleaner, or both, has helical flighting coiled about a shaft, the flighting being formed by a series of separate sections, individually threaded on the shaft, the sections being stamped from sheet material and twisted to shape. Releasable attachment of the sections to the shaft through use of notched plates is such as to permit limited wobbling for enhancing the cleaning effect and discourage clogging with foreign matter.

9 Claims, 6 Drawing Figures

PATENTED MAR 14 1972 3,648,826
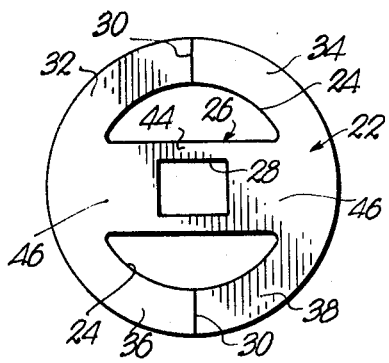
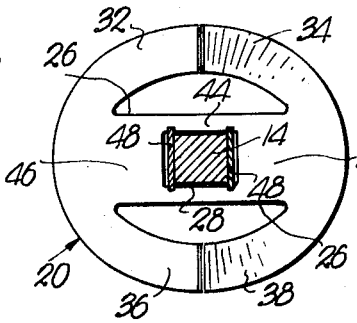
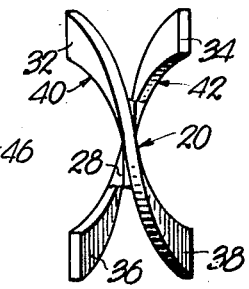
Fig. 1.   Fig. 2.   Fig. 3.   Fig. 4.
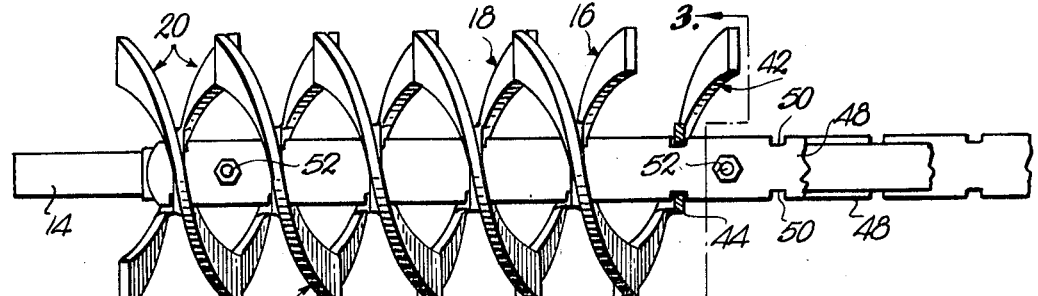
Fig. 5.
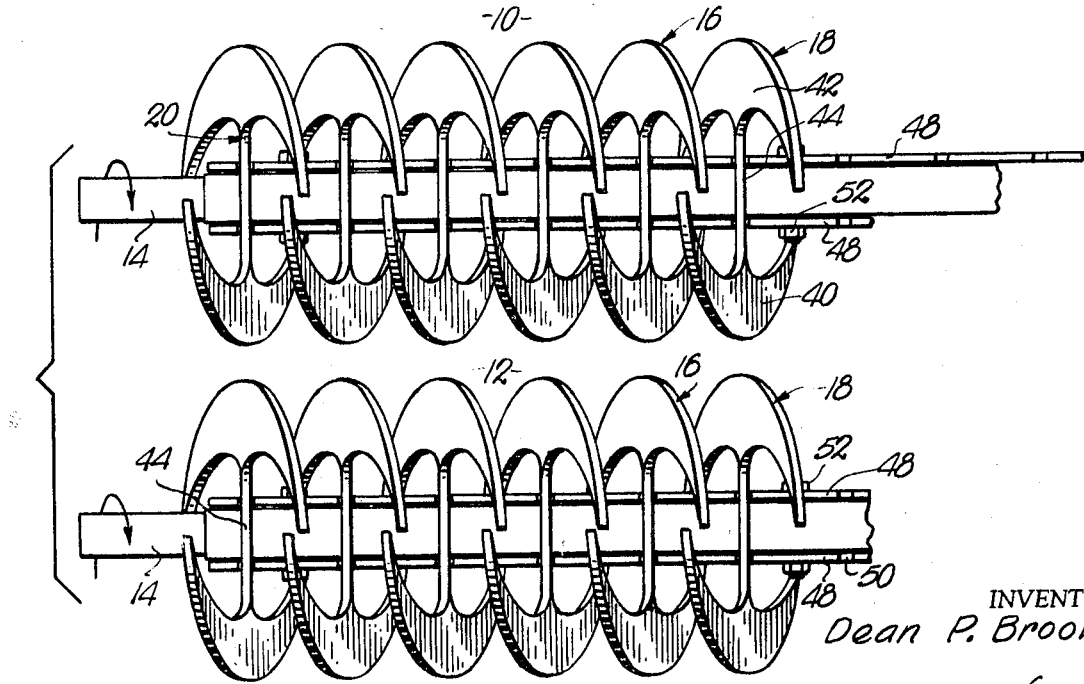
Fig. 6.
INVENTOR
Dean P. Brooks
BY Schmidt, Johnson, Hovey,
Williams & Bradley
ATTORNEYS

CONVEYOR-CLEANER

It is an important object of my present invention to provide a conveyor-cleaner that will (a) elevate and convey material [such as sugar beets] either axially or transversely of the axes of a pair of double lead helically flighted, parallel shafts rotating in the same direction; (b) remove foreign matter [such as dirt] from the material; (c) preclude wrap-up of long, stringlike substances [such as weeds] around the shaft; and (d) prevent buildup or collection of sticky substances [such as mud] on or between the flight sections.

In the drawing:

FIG. 1 is an elevational view of a disc used in the formation of the individual flight sections of the conveyor-cleaner forming the subject matter of the instant invention;

FIG. 2 is an edge view of the disc;

FIG. 3 is a transverse cross-sectional view taken on line 3—3 of FIG. 5;

FIG. 4 is an edge view of one of the flight sections;

FIG. 5 is a fragmentary elevational view of one of the flighted shafts of the conveyor-cleaner, parts being broken away and in section for clearness; and FIG. 6 is a plan view in fragmentation of the conveyor-cleaner.

The screw apparatus illustrated in FIG. 6 of the drawing comprises two or more units 10 and 12, and since they are identical, only one will be explained with particular reference to FIGS. 1-5. Transversely square shaft 14 is provided with double lead helical flighting 16 and 18 resulting from the use of a plurality of individual sections 20, one of which is shown in FIG. 4 prior to mounting on shaft 14. Each section 20 is made by stamping or otherwise forming a circular disc 22 (FIG. 1) from sheet material with a pair of spaced holes 24 presenting a median diametrical bar 26 having a central rectangular opening 28. A pair of spaced slits 30 normal to the longitudinal axis of bar 26 extend from the periphery of disc 22 to the corresponding opening 24 presenting four arcuate wings 32, 34, 36 and 38.

These wings, and therefore a portion of the bar 26, are then twisted in the manner illustrated by FIG. 4 to present a pair of elongated helical blades 40 and 42. It is seen in FIG. 4 that blade 40 includes the two diagonally opposed wings 32 and 38 whereas blade 42 includes the two diagonally opposed wings 34 and 36. Wings 32 and 36 are offset in one direction from the plane of bar 26 and wings 34 and 38 are offset in the opposite direction from the plane of bar 26.

That area of bar 26 which bounds the opening 28 remains untwisted, presenting a hub 44 substantially perpendicular to shaft 14. The remaining areas of the bar 26 twist slightly with the blades 40 and 42, presenting a pair of spokes 46, one on each side respectively of the opening 28. Accordingly, each of the blades 40 becomes one half of a turn in flighting 16 and each of the blades 42 becomes one half of a turn in the flighting 18.

The sections 20 are assembled on the shaft 14 by first threading them onto a pair of elongated plates 48. While the plates 48 are wider than the thickness of shaft 14, they are narrower than the length of opening 28 and can, therefore, be easily threaded through openings 28.

Thereupon the plates 48 may be rotated relative to the sections 20 so that the hubs 44 are received in opposed notches 50 in plates 48. The width of opening 28 is slightly greater than the thickness of the shaft 14; therefore, shaft 14 may be easily slipped into place between the two plates 48 and attached thereto by a plurality of crossbolts 52.

Noteworthy in FIG. 5 is the fact that the depth and width of notches 50 are such as to provide a loose fit for the hubs 44 therein. Moreover, as seen in FIG. 3, there is a looseness of fit of hubs 44 on the shaft 14 along the width of openings 28, as well as along the length thereof even with the plates 48 threaded inside the openings 28 on opposite sides of shaft 14. Such looseness permits the sections 20 to wobble during rotation of the shafts 14 in the same direction as indicated by the arrows in FIG. 6.

It is to be noted in FIGS. 5 and 6 that blades 40 and 42 are twisted so that the trailing end of one blade tends to shield or shingle the leading end of the next adjacent blade so that all material including foreign matter readily passes from the trailing end of one blade to the leading end of the next adjacent blade without catching thereon or entanglement therewith.

When the units 10 and 12 are used together as shown in FIG. 6 with their shafts 14 parallel, they are capable of conveying material transversely of the longitudinal axes of shafts 14, assuming of course that such material is too large to gravitate through the flightings or between the two units. One suggested use, therefore, is in connection with sugar beet harvesters having an arrangement wherein such movement from the diggers to the elevators is desired. During the conveyance, dirt will be removed from the beets and gravitate through the flighting back to the field. The flexibility that permits wobbling as above described not only appreciably enchances the dirt removal action but tends to prevent collection of mud on or between the sections 20.

If, on the other hand, it is desired to convey axially of the units 10 and 12 therebetween it is but necessary to place one of the shafts 14 at an elevation higher than the other shaft while maintaining them in parallelism. Still further, the shafts 14 may be located at the same elevation and in parallelism with the outlet ends of the shafts 14 higher than their opposite ends, resulting in conveyance and elevation in both an axial and a transverse direction, the material moving diagonally of units 10 and 12. Since there are no intermeshing fingers, as in conventional structures, between the units 10 and 12, there is little tendency for weeds and the like to become wrapped around the shafts 14. Still further, either of the units 10 or 12 may be used in conjunction with augers, rolls or the like differing from the construction illustrated in the drawing, as for example, in parallelism with a smooth roll for purposes comparable to those hereinabove enumerated.

Having thus described the invention, what is claimed as new and desired to be secured by Letters Patent is:

1. In screw apparatus:
   an elongated, rotatable shaft;
   a flighting extending longitudinally of the shaft and coiled thereabout,
   said flighting comprising a helical row of separate, elongated, spaced apart, helically twisted blades;
   structure for each blade respectively separately mounting the same on the shaft for rotation therewith; and
   spacer means on the shaft for maintaining said structure in spaced relation axially of the shaft,
   said blades each having a leading end and a trailing end,
   the trailing end of each blade being axially offset relative to the leading end of the next adjacent blade in a direction to cause the trailing ends to tend to shield the leading ends.

2. In screw apparatus;
   an elongated, rotatable shaft;
   a pair of double lead flightings extending longitudinally of the shaft and coiled thereabout,
   each flighting comprising a helical row of separate, elongated, spaced apart, helically twisted blades,
   said blades being arranged in pairs, with one blade of one flighting disposed diametrically opposite one blade of the other flighting;
   a hub and spoke assembly spanning the distance between and rigidly interconnecting each pair of blades respectively, with the hub of each assembly threaded on the shaft for rotation therewith; and
   means maintaining the hubs spaced axially of the shaft.

3. In screw apparatus as set forth in claim 2,
   each pair of blades and its assembly comprising an initially flat disc having a median bar provided with a central, shaft-receiving opening,
   said disc having a pair of spaced slits at its periphery normal to the bar, presenting four arcuate wings adapted for twisting to form said blades.

4. Screw apparatus comprising:

a pair of spaced, elongated, rotatable shafts;
a pair of double lead flightings extending longitudinally of each shaft respectively and coiled thereabout,
each flighting comprising a helical row of separate, elongated, spaced apart, helically twisted blades,
said blades being arranged in pairs, with one blade of one flighting disposed diametrically opposite one blade of the other flighting;
a hub and spoke assembly spanning the distance between and rigidly interconnecting each pair of blades respectively, with the hub of each assembly surrounding the corresponding shaft for rotation therewith; and
means maintaining the hubs spaced axially of their shafts.

5. A section for screw apparatus comprising:
an initially flat, circular disc having a pair of spaced holes, presenting a median bar provided with a central opening adapted to receive a rotatable shaft,
said disc having a pair of spaced slits normal to the bar and extending from its periphery to a corresponding hole, presenting four arcuate wings,
said wings being twisted to present a pair of opposed helical blades with each blade offset from the plane of the bar in a direction opposite to the direction of offset from said plane of a diagonally opposed blade.

6. In screw apparatus:
an elongated, rotatable shaft;
a plurality of conveyor sections threaded on the shaft to present a pair of double lead flightings extending longitudinally of the shaft, each section comprising:
an initially flat, circular disc having a pair of spaced holes, presenting a median bar provided with a central opening adapted to receive a screw conveyor shaft,
said disc having a pair of spaced slits normal to the bar and extending from its periphery to a corresponding hole, presenting four arcuate wings,
said wings being twisted to present a pair of opposed helical blades with each blade offset from the plane of the bar in a direction opposite to the direction of offset from said plane of a diagonally opposed blade;
means maintaining the bars spaced axially of the shaft; and
means retaining the sections for rotation with the shaft.

7. In screw apparatus as set forth in claim 6,
said openings and the cross-sectional configuration of the shaft being polygonal; and
a pair of opposed plates secured to the shaft and passing through the openings,
each plate having a pair of opposed bar-receiving notches for each section respectively.

8. In screw apparatus as set forth in claim 7,
the bars being loose on the shaft and on the plates and loose within the openings, permitting the sections to wobble relative to the shaft.

9. In screw apparatus:
an elongated, rotatable shaft;
a flighting extending longitudinally of the shaft and coiled thereabout,
said flighting comprising a helical row of separate, elongated, spaced apart, helically twisted blades;
structure for each blade respectively separately mounting the same on the shaft for rotation therewith;
spacer means on the shaft for maintaining said structure in spaced relation axially of the shaft,
each structure including a hub surrounding the shaft, and means limiting the extent of rotation of the hub relative to the shaft,
each hub having an opening loosely receiving the shaft and said spacer means, permitting the blades to wobble relative to the shaft,
said openings and the cross-sectional configuration of the shaft being polygonal,
said spacer means including plate means on the shaft having notches loosely receiving said hubs.

* * * * *